Patented Dec. 7, 1948

2,455,778

UNITED STATES PATENT OFFICE 2,455,778

COPOLYMERS OF 1-ACYLOXY-1,3-BUTADIENES AND ACRYLONITRILE

William O. Kenyon and Cornelius C. Unruh, Rochester, N. Y., assignors to Eastman Kodak Company, Rochester, N. Y., a corporation of New Jersey No Drawing. Application September 13, 1947, Serial No. 773,940

19 Claims. (Cl. 260—84)

This invention relates to the preparation of copolymers of 1-acyloxy-1,3-butadienes and acrylonitrile, and is a continuation-in-part of our application Serial No. 519,204, filed January 21, 1944, now United States Patent 2,432,460, dated December 9, 1947.

In our copending application Serial No. 519,-204, we have shown that valuable copolymers may be prepared by copolymerizing a mixture consisting of a methyl isopropenyl ketone and a 1-acyloxy-1,3-butadiene. We have now found that copolymers of a 1-acyloxy-1,3-butadiene may be prepared by copolymerizing a mixture consisting of a 1-acyloxy-1,3-butadiene and acrylonitrile. Surprisingly, 1-acyloxy-1,3-butadienes cannot be successfully copolymerized with olefinic compounds, such as methallyl alcohol, methallyl acetate, ethyl methallyl ether, and vinyl acetate. The copolymers of the present invention, on the other hand, may be prepared with ease and may readily be adapted for such uses as safety glass interlayers, protective coatings, adhesive compositions, etc.

It is, therefore, an object of this invention to provide new copolymers of 1-acyloxy-1,3-butadienes.

A further object of this invention is to provide a process for preparing new copolymers of 1-acyloxy-1,3-butadienes. Other objects will become apparent from a consideration of the following description.

The 1-acyloxy-1,3-butadienes which may be used in our process may advantageously be represented by the formula:

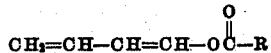

wherein R is an alkyl group, such as methyl, ethyl, n-propyl, and isopropyl (i. e. an alkyl group having the formula $C_nH_{2n+1}$ where $n$ is a positive integer from 1 to 3). Typical are: 1-acetoxy-1,3-butadiene, 1-propionoxy-1,3-butadiene, 1-n-butyroxy-1,3-butadiene, and 1-isobutyroxy-1,3-butadiene. These esters may conveniently be prepared by reacting crotonaldehyde with a carboxylic acid anhydride in the presence of an alkali metal salt of a carboxylic acid in the manner described in Kaufler U. S. Patent 2,215,180, dated September 17, 1940.

In accordance with the process of our invention, we polymerize a mixture consisting of a 1-acyloxy-1,3-butadiene and acrylonitrile. The polymerization may be accelerated to a considerable extent by heating or by catalysts which are known to accelerate the polymerization of vinyl-type compounds, such as the organic peroxides (e. g. benzoyl peroxide, acetyl peroxide, acetyl benzoyl peroxide, lauroyl peroxide, oleoyl peroxide, etc.), the alkali metal perborates (e. g. sodium and potassium perborates), hydrogen peroxide, and the alkali metal persulfates (e. g. sodium, potassium, and ammonium, persulfates). Temperatures used when heating may vary from approximately room temperature (20° C.) to 80° C., although lower or somewhat higher temperatures may be used if so desired.

Advantageously, the polymerization may be performed in the presence of a diluent. The diluent (e. g. acetone), if employed, is advantageously a solvent for the polymer. The polymerization may also be carried out by the bead or emulsion method, in which water, or some other medium, in which the monomers are insoluble is employed as a dispersing medium, with or without emulsifying agents.

The ratio of 1-acyloxy-1,3-butadiene to acrylonitrile may be varied over a relatively wide range; however, for practical purposes, the ratio of 9 to 1 parts by weight of 1-acyloxy-1,3-butadiene to 1 part by weight of acrylonitrile is adequate. Such a ratio in the monomeric mixture prior to polymerization gives approximately 2.0 to 8.0% by weight of nitrogen in the copolymer. Advantageously the copolymers produced in accordance with our invention may contain from approximately 5.0 to 8.0% by weight of nitrogen.

More than one 1-acyloxy-1,3-butadiene may be employed in a single polymerization, however there is ordinarily no advantage in doing so.

The following examples will serve to characterize our invention further.

Example I

Acrylonitrile and 1-acetoxy-1,3-butadiene, in the quantities illustrated in the tabulation below, are placed in glass ampoules together with benzoyl peroxide as a polymerization catalyst. The air is evacuated from the ampoules and replaced with nitrogen gas, and the ampoules then sealed. The ampoules are then placed in a water bath, maintained at the temperatures given in the tabulation below, until the polymerization is complete. The resulting products are then dissolved in acetone and poured into a large excess of methanol. A voluminous precipitate is obtained, which is again dissolved in acetone, and reprecipitated in excess methanol. The product thus obtained is then dried in vacuo. The nitrogen content of the copolymer is determined in order to indicate the ratio of 1-acetoxy-1,3-butadiene to acrylonitrile in the copolymer. The following tabulation illustrates some of the copolymers which we have obtained, operating in this manner:

| Expt. No. | 1-acetoxy-1,3-butadiene, pts. by wt. | Acrylonitrile, pts. by wt. | Wt. ratio 1-acetoxy-1,3-butadiene/acrylonitrile | Catalyst, pts. by wt. | Temp. °C. | Time of Polymerization Days | Yield, pts. by wt. | Per cent N content of copolymer | Molar ratio 1-acetoxy-1,3-butadiene/acrylonitrile in copolymer | Observations |
|---|---|---|---|---|---|---|---|---|---|---|
| 1 | 18.0 | 2.0 | 9:1 | 0.10 | 50 | 12 | 2.0 | 2.6 | 4.3:1 | Clear, viscous mass. |
| 2 | 16.0 | 4.0 | 4:1 | 0.10 | 50 | 12 | 7.0 | 4.3 | 2.4:1 | Clear, very viscous mass. |
| 3 | 14.0 | 6.0 | 2.3:1 | 0.10 | 50 | 12 | 10.0 | 6.4 | 1.5:1 | Clear, soft, rubbery mass. |
| 4 | 12.0 | 8.0 | 1.5:1 | 0.10 | 50 | 12 | 13.0 | 7.8 | 1.13:1 | Do. |
| 5[1] | 10.0 | 10.0 | 1:1 | 0.10 | 50 | 12 | 3.0 | 8.0 | 1.09:1 | Hazy, soft, partially sol. rubbery mass. |

[1] The acetone soluble portion of this sample was purified as described above.

*Example II*

Eight (8) parts by weight of 1-acetoxy-1,3-butadiene, four (4) parts by weight of acrylonitrile, and 0.012 part by weight of benzoyl peroxide are sealed in a glass ampoule having an atmosphere of nitrogen, and the ampoule placed in a constant temperature oven maintained at 70° C. After two days a clear, viscous mass has formed, which is then dissolved in acetone, and precipitated in an excess of methanol. The precipitate is again dissolved in acetone, and reprecipitated in methanol. The precipitate is then dried at 50° C. in vacuo. A yield of 3.5 parts by weight of a copolymer having a nitrogen content of 7.5 per cent is obtained. This represents a molar ratio in the copolymer of 1-acetoxy-1,3-butadiene to acrylonitrile of 1.2:1.0.

When 10 parts by weight of 1-isobutyroxy-1,3-butadiene is copolymerized with 4 parts by weight of acrylonitrile exactly as described in the above example, a soft, clear, viscous copolymer having 6.0% by weight of nitrogen is obtained.

*Example III*

Eight (8) parts by weight of 1-acetoxy-1,-3-butadiene, four (4) parts by weight of acrylonitrile, and 0.12 part by weight of benzoyl peroxide are sealed in a glass ampoule in an inert atmosphere, and allowed to stand at room temperature (25°–26° C.) for 26 days. The contents of the ampoule are then dissolved in acetone, and then precipitated in an excess of methanol. The precipitate is again dissolved in acetone and reprecipitated in excess methanol, then dried in vacuo. After drying, 3.5 parts by weight of a clear, viscous copolymer containing 6.2% by weight of nitrogen are obtained. This percentage of nitrogen corresponds to a molar ratio of 1-acetoxy-1,3-butadiene to acrylonitrile in the copolymer of 1.5:1.0.

When 9 parts by weight of 1-propionoxy-1,3-butadiene, 4 parts by weight of acrylonitrile, and 0.1 part by weight of benzoyl peroxide are placed in a glass ampoule in an inert atmosphere, and allowed to stand at room temperature, as described in Example III, a clear, viscous copolymer is obtained, after purification, having 5.5% nitrogen by weight.

*Example IV*

Fifty-six (56.0) parts by weight of 1-acetoxy-1,3-butadiene, twenty-six and one-half (26.5) parts by weight of acrylonitrile, and 0.412 part by weight of benzoyl peroxide are sealed together in a glass ampoule in an inert atmosphere, and placed in a water bath maintained at 50° C. After five (5) days, a clear, tough, rubbery mass has formed, and this mass is then dissolved in acetone, and slowly poured into an excess of stirred methanol. A soft precipitate forms, which is again dissolved in acetone, and again precipitated in methanol. The precipitate is dried in vacuo at 50° C. and weighed. Forty (40) parts of copolymer having a nitrogen content of 4.9% by weight are thus obtained. The nitrogen content corresponds to a molar ratio of 1-acetoxy-1,3-butadiene to acrylonitrile in the copolymer of 2.1:1.0.

*Example V*

This example illustrates the bead or emulsion method of polymerization. A solution of 34.0 parts by weight of 1-acetoxy-1,3-butadiene and 11.4 parts by weight of acrylonitrile are added to a solution having the following composition contained in a pressure vessel: 0.114 part by weight of potassium persulfate. 0.50 part by weight of sodium lauryl sulfate. 200.0 parts by weight of distilled water. The supernatant air in the vessel is displaced by nitrogen, and the vessel sealed. The sealed vessel is then placed in constant temperature water-bath maintained at 50° C. and tumbled for 5 days, although the polymerization appears to be substantially complete in a shorter time. The emulsion is then broken by the addition of a small amount of saturated salt solution. A rubbery conglomerate is obtained which is insoluble, but swells, in acetone. The rubbery copolymer is placed in water and thoroughly steamed for one hour, at the end of which time the odor of monomers can no longer be detected. The treated polymer is then cut in small pieces and dried in vacuo at 50° C. After drying, thirty-five (35) parts by weight are thus obtained, having a nitrogen content of 4.7% by weight. This nitrogen content corresponds to a molar ratio of 1-acetoxy-1,3-butadiene to acrylonitrile in the copolymer of 2.2:1.0.

*Example VI*

As in Example V above, a solution of 34.0 parts by weight of 1-acetoxy-1,3-butadiene and 11.4 parts by weight of acrylonitrile are added to a solution having the following composition contained in a pressure vessel:

| | Parts by weight |
|---|---|
| Potassium persulfate | 0.114 |
| Sodium lauryl sulfate | 0.50 |
| Lauryl mercaptan | 0.10 |
| Distilled water | 200.0 |

The supernatant air in the vessel is displaced by nitrogen, and the vessel sealed. The sealed vessel is then tumbled in a constant temperature water-bath maintained at 50° C. for 5 days. After polymerization is complete, the emulsion is broken by the addition of a small amount of saturated sodium chloride solution, and the precipitate washed with water. The precipitate is then dissolved in acetone to give a clear, viscous solution, which is slowly poured into an excess of stirred methanol. The soft precipitate which thus forms is again dissolved in acetone, and slowly poured into thoroughly agitated water. The reprecipitated product is then dried in vacuo at 50° C. After drying, 40 parts by weight of copolymer having a nitrogen content of 5.2% by weight are obtained. This percentage of nitrogen corresponds to a molar ratio of 1-acetoxy-1,3-butadiene to acrylonitrile of 1.9:1.0.

In a similar manner, a copolymer of 1-n-butyroxy-1,3-butadiene and acrylonitrile having a nitrogen content of 5.0% by weight can be prepared.

We claim:

1. A resinous copolymer of a 1-acyloxy-1,3-butadiene represented by the formula:

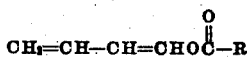

wherein R is an alkyl group having 1 to 3 carbon atoms and acrylonitrile represented by the formula:

$$CH_2=CH-C\equiv N$$

containing from 2.0 to 8% by weight of nitrogen, said copolymer having been prepared from a mixture consisting of the 1-acyloxy-1,3-butadiene and acrylonitrile.

2. A resinous copolymer of 1-acetoxy-1,3-butadiene having the formula:

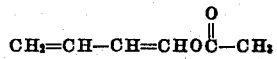

and acrylonitrile having the formula:

$$CH_2=CH-C\equiv N$$

containing 2.0 to 8.0% by weight of nitrogen, said copolymer having been prepared from a mixture consisting of 1-acetoxy-1,3-butadiene and acrylonitrile.

3. A resinous copolymer of a 1-acyloxy-1,3-butadiene represented by the formula:

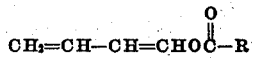

wherein R is an alkyl group having 1 to 3 carbon atoms and acrylonitrile represented by the formula:

$$CH_2=CH-C\equiv N$$

containing 2.6% by weight of nitrogen, said copolymer having been prepared from a mixture consisting of the 1-acyloxy-1,3-butadiene and acrylonitrile.

4. A resinous copolymer of a 1-acyloxy-1,3-butadiene represented by the formula:

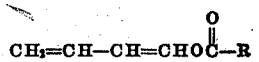

wherein R is an alkyl group having 1 to 3 carbon atoms and acrylonitrile represented by the formula:

$$CH_2=CH-C\equiv N$$

containing 5.2% by weight of nitrogen, said copolymer having been prepared from a mixture consisting of the 1-acyloxy-3-butadiene and acrylonitrile.

5. A resinous copolymer of a 1-acyloxy-1,3-butadiene represented by the formula:

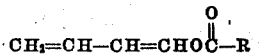

wherein R is an alkyl group having 1 to 3 carbon atoms and acrylonitrile represented by the formula:

$$CH_2=CH-C\equiv N$$

containing 7.8% by weight of nitrogen, said copolymer having been prepared from a mixture consisting of the 1-acyloxy-1,3-butadiene and acrylonitrile.

6. A resinous copolymer of 1-acetoxy-1,3-butadiene having the formula:

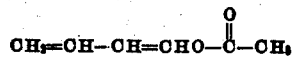

and acrylonitrile having the formula:

$$CH_2=CHC\equiv N$$

containing 2.6% by weight of nitrogen, said copolymer having been prepared from a mixture consisting of 1-acetoxy-1,3-butadiene and acrylonitrile.

7. A resinous copolymer of 1-acetoxy-1,3-butadiene having the formula:

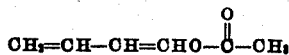

and acrylonitrile having the formula:

$$CH_2=CHC\equiv N$$

containing 5.2% by weight of nitrogen, said copolymer having been prepared from a mixture consisting of 1-acetoxy-1,3-butadiene and acrylonitrile.

8. A resinous copolymer of 1-acetoxy-1,3-butadiene having the formula:

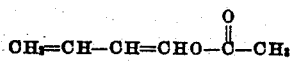

and acrylonitrile having the formula:

$$CH_2=CHC\equiv N$$

containing 7.8% by weight of nitrogen, said copolymer having been prepared from a mixture consisting of 1-acetoxy-1,3-butadiene and acrylonitrile.

9. A process for preparing a resinous copolymer comprising heating in the presence of a peroxide polymerization catalyst a mixture consisting of 9:1 parts by weight of 1-acetoxy-1,3-butadiene having the formula:

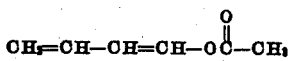

and 1:1 parts by weight of acrylonitrile.

10. A process for preparing a resinous copolymer comprising heating in the presence of a peroxide polymerization catalyst a mixture consisting of 3 parts by weight of 1-acetoxy-1,3-butadiene having the formula:

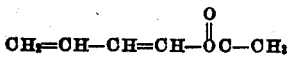

and 1 part by weight of acrylonitrile.

11. A process for preparing a resinous copolymer comprising heating in the presence of a peroxide polymerization catalyst a mixture consisting of 1.5 parts by weight of 1-acetoxy-1,3-butadiene having the formula:

and 1 part by weight of acrylonitrile.

12. A process for preparing a resinous copolymer comprising heating in the presence of a peroxide polymerization catalyst a mixture consisting of 9 parts by weight of 1-acetoxy-1,3-butadiene having the formula:

$$CH_2=CH-CH=CH-O\overset{O}{\overset{\|}{C}}-CH_3$$

and 1 part by weight of acrylonitrile.

13. A process for preparing a resinous copolymer comprising heating in the presence of a peroxide polymerization catalyst a mixture consisting of 9:1 parts by weight of a 1-acyloxy-1,3-butadiene represented by the formula:

$$CH_2=CH-CH=CH-O\overset{O}{\overset{\|}{C}}-R$$

wherein R is an alkyl group having 1 to 3 carbon atoms, and 1:1 parts by weight of acrylonitrile having the formula:

$$CH_2=CHC\equiv N$$

14. A process for preparing a resinous copolymer comprising heating in the presence of a peroxide polymerization catalyst a mixture consisting of 9 parts by weight of a 1-acyloxy-1,3-butadiene represented by the formula:

$$CH_2=CH-CH=CH-O\overset{O}{\overset{\|}{C}}-R$$

wherein R is an alkyl group having 1 to 3 carbon atoms, and 1 part by weight of acrylonitrile having the formula:

$$CH_2=CHC\equiv N$$

15. A process for preparing a resinous copolymer comprising heating in the presence of a peroxide polymerization catalyst a mixture consisting of 3 parts by weight of a 1-acyloxy-1,3-butadiene represented by the formula:

$$CH_2=CH-CH=CH-O\overset{O}{\overset{\|}{C}}-R$$

wherein R is an alkyl group having 1 to 3 carbon atoms and 1 part by weight of acrylonitrile having the formula:

$$CH_2=CHC\equiv N$$

16. A process for preparing a resinous copolymer comprising heating in the presence of a peroxide polymerization catalyst a mixture consisting of 1.5 parts by weight of a 1-acyloxy-1,3-butadiene represented by the formula:

$$CH_2=CH-CH=CH-O\overset{O}{\overset{\|}{C}}-R$$

wherein R is an alkyl group having 1 to 3 carbon atoms, and 1 part by weight of acrylonitrile having the formula:

$$CH_2=CHC\equiv N$$

17. A process for preparing a resinous copolymer comprising heating in the presence of benzoyl peroxide a mixture consisting of 9:1 parts by weight of 1-acetoxy-1,3-butadiene having the formula:

$$CH_2=CH-CH=CH-O\overset{O}{\overset{\|}{C}}-CH_3$$

and 1:1 parts by weight of acrylonitrile.

18. A process for preparing a resinous copolymer comprising heating in the presence of benzoyl peroxide a mixture consisting of 3 parts by weight of 1-acetoxy-1,3-butadiene having the formula:

$$CH_2=CH-CH=CH-O\overset{O}{\overset{\|}{C}}-CH_3$$

and 1 part by weight of acrylonitrile.

19. A process for preparing a resinous copolymer comprising heating in the presence of benzoyl peroxide a mixture consisting of 1.5 parts by weight of 1-acetoxy-1,3-butadiene having the formula:

$$CH_2=CH-CH=CH-O\overset{O}{\overset{\|}{C}}-CH_3$$

and 1 part by weight of acrylonitrile.

WILLIAM O. KENYON.
CORNELIUS C. UNRUH.

No references cited.

Certificate of Correction

December 7, 1948.

Patent No. 2,455,778.

WILLIAM O. KENYON ET AL.

It is hereby certified that errors appear in the printed specification of the above numbered patent requiring correction as follows:

Column 5, line 68, claim 4, for "1-acyloxy-3-butadiene" read *1-acyloxy-1,3-butadiene*; column 6, line 71, claim 11, for the right-hand portion of the formula reading "$CH_2$" read $CH_3$;

and that the said Letters Patent should be read with these corrections therein that the same may conform to the record of the case in the Patent Office.

Signed and sealed this 26th day of April, A. D. 1949.

[SEAL]

THOMAS F. MURPHY,
*Assistant Commissioner of Patents.*